United States Patent
Suganuma (10) Patent No.: US 9,081,738 B2
(45) Date of Patent: Jul. 14, 2015

(54) DISK ARRAY DEVICE, DISK ARRAY CONTROL METHOD, AND RECORDING MEDIUM

(71) Applicant: NEC CORPORATION, Minato-ku, Tokyo (JP)

(72) Inventor: Shigeru Suganuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 194 days.

(21) Appl. No.: 13/628,148

(22) Filed: Sep. 27, 2012

(65) Prior Publication Data

US 2013/0086319 A1 Apr. 4, 2013

(30) Foreign Application Priority Data

Sep. 29, 2011 (JP) ................................. 2011-215267

(51) Int. Cl.
*G06F 11/10* (2006.01)
*G06F 12/16* (2006.01)

(52) U.S. Cl.
CPC ............ *G06F 12/16* (2013.01); *G06F 11/1096* (2013.01)

(58) Field of Classification Search
CPC .................................................. G06F 11/1096
See application file for complete search history.

(56) References Cited

U.S. PATENT DOCUMENTS

2010/0251071 A1* 9/2010 Fujiwara ....................... 714/763

FOREIGN PATENT DOCUMENTS

| JP | 2000-207136 A | 7/2000 |
|---|---|---|
| JP | 2000-259359 A | 9/2000 |
| JP | 2006-3971 A | 1/2006 |
| JP | 2007-200027 A | 8/2007 |
| JP | 2008-186400 A | 8/2008 |
| JP | 2008-204247 A | 9/2008 |
| JP | 2011-008426 A | 1/2011 |
| WO | 2009/050761 A1 | 4/2009 |

OTHER PUBLICATIONS

Plank, J., A Tutorial on Reed-Solomon Coding for Fault-Tolerance in RAID-like Systems, 1996, John Wiley & Sons, Ltd., 18 pages (pp. 995-1012).*

(Continued)

*Primary Examiner* — Aimee Li
*Assistant Examiner* — Gary W Cygiel
(74) *Attorney, Agent, or Firm* — Sughrue Mion, PLLC (57) ABSTRACT

A disk array device includes a plurality of disk devices, and a computation portion generating a redundant code data denoting a redundant code able to recover an actual data sent from a higher-level device based on the actual data and operators, when at least part of the actual data is lost. The actual data is written by a predetermined device quantity of first disk devices in a first disk device group composed of disk devices as the first disk devices among the plurality of disk devices. The redundant code data is written by second disk devices of the same quantity as the predetermined device quantity of the first disk devices, in a second disk device group composed of disk devices as the second disk devices other than the first disk devices among the plurality of disk devices. The computation portion generates the redundant code data able to recover the actual data based on the data written into arbitrary disk devices of the device quantity among the plurality of disk devices, while the number of types of the operators used for generating the redundant code data is less than the device quantity by one or more.

4 Claims, 11 Drawing Sheets

(56) References Cited

OTHER PUBLICATIONS

Japanese Office Action for JP Application No. 2011-215267 mailed on Aug. 22, 2013 with English Translation.

James S. Plank, "A Tutorial on Reed-Solomon Coding for Fault-Tolerance in RAID-like Systems" (Software-Practice and Experience, vol. 27, No. 9, Sep. 1997, pp. 995-1012).

* cited by examiner

$$\begin{bmatrix} d_1 \\ d_2 \\ d_3 \\ d_4 \\ d_5 \\ d_6 \end{bmatrix} = \begin{bmatrix} 1 & T_1 & T_2 & T_3 & T_4 & - \\ T_1 & 1 & T_2 & T_3 & T_4 & - \\ - & - & T_4 & T_3 & T_2 & T_1 \\ 1 & - & - & T_4 & T_3 & T_2 \\ T_2 & T_1 & - & - & T_4 & T_3 \\ T_3 & T_2 & T_1 & - & - & T_4 \\ T_4 & T_3 & T_2 & T_1 & - & - \end{bmatrix} \begin{bmatrix} c_1 \\ c_2 \\ c_3 \\ c_4 \\ c_5 \\ c_6 \end{bmatrix}$$

RELATED ART

Fig.9

$$\underbrace{\begin{matrix} | & | & | & | & ----- & | & | \\ | & T & T_2 & T_3 & & T_{n-2} & T_{n-1} \\ | & T^2 & T_2^2 & T_3^2 & & T_{n-2}^2 & T_{n-1}^2 \\ \underbrace{\phantom{|}}_{n} & T^3 & T_2^3 & T_3^3 & ----- & T_{n-2}^3 & T_{n-1}^3 \\ | & \vdots & \vdots & \vdots & & \vdots & \vdots \\ | & T^{n-2} & T_2^{n-2} & T_3^{n-2} & ----- & T_{n-2}^{n-2} & T_{n-1}^{n-2} \\ | & T^{n-1} & T_2^{n-1} & T_3^{n-1} & ----- & T_{n-2}^{n-1} & T_{n-1}^{n-1} \end{matrix}}_{n}$$

RELATED ART

Fig.10

$$\begin{pmatrix} c_1 \\ c_2 \\ c_3 \\ c_4 \\ c_5 \\ c_6 \end{pmatrix} = \begin{pmatrix} 1 & 1 & T & 1 & 1 & 1 \\ 1 & T & T^4 & T^2 & T^8 & T^5 \\ 1 & T^2 & T^8 & T^4 & T & T^{10} \\ 1 & T^3 & T^{15} & T^6 & T^9 & 1 \\ 1 & T^4 & T & T^8 & T^2 & T^5 \\ 1 & T^5 & T^4 & T^{10} & T^{10} & T^{10} \end{pmatrix} \begin{pmatrix} d_1 \\ d_2 \\ d_3 \\ d_4 \\ d_5 \\ d_6 \end{pmatrix}$$

RELATED ART

Fig.11

DISK ARRAY DEVICE, DISK ARRAY CONTROL METHOD, AND RECORDING MEDIUM

INCORPORATION BY REFERENCE

The present application claims priority from Japanese Patent Application No. 2011-215267, filed on Sep. 29, 2011 in Japan, the disclosure of which is incorporated herein by reference in its entirety.

TECHNICAL FIELD

The present invention relates to a disk array device used as an external device of information processing devices, a disk array control method, and a program for controlling disk array.

BACKGROUND ART

Disk array devices recording data after adding redundant codes to the data have been developed to prevent loss of the data. Such disk array devices are generally classified, by the redundancy and control method, into six types from RAID0 to RAID5 (RAID: Redundant Arrays of Inexpensive Disks or Redundant Arrays of Independent Disks).

Further, recently, by implementing the technique based on the thesis disclosed in the following Nonpatent Document 1 into disk array devices, the disk array devices called RAID6, Double Parity and the like with multiple redundancies have also been realized.

[Nonpatent Document 1] James S. Plank, "A Tutorial on Reed-Solomon Coding for Fault-Tolerance in RAID-like Systems" (Software-Practice and Experience, Volume 27, Number 9, September 1997, pp. 995-1012)

For a disk array device, it is possible to improve its reliability as a device by raising the redundancy and, by improving the reliability in this manner, it becomes possible to reduce the probability of occurrence of losing data which causes loss of the recorded information. However, since the redundancy is in a trade-off relation with the recording capacity of the device, raising the redundancy results in reducing the actual capacity usable to record information. Further, raising the redundancy gives rise to upsizing a computation circuit needed for computing redundant codes, and increasing the cost of the computation circuit. As a result, the unit price of the disk array device also increases.

For example, because the configuration of RAID1 has a high redundancy and almost does not need the redundant computation, it is used for the purpose of high reliability. The RAID1 is a method for recording the same data into two disk devices, and is therefore also referred to as mirroring.

However, in the RAID1, if such a case occurs as the two mirrored disk devices both fail to operate properly, then it is possible cause data loss. For example, when constituting a RAID with 12 disk devices, in the configuration of RAID1, if p represents the probability of failure of disk devices, then data loss occurs with the probability of 6×p×p. This means that data loss occurs only when failure has occurred in six different combinations of the mirrored disks among the 72 combinations of two arbitrary disks.

In order to deal with the failure of a plurality of disk devices as above, it is necessary to construct a disk array of the multiple-redundancy configuration based on the thesis of Nonpatent Document 1. For example, in the so-called RAID6 method, even if failure occurs in any two disk devices, it is still possible to recover the data.

However, even in the RAID6 method, if failure occurs in three disks or more, it is still possible to give rise to data loss.

Nonpatent Document 1 shows a method for configuring a disk array device capable of recovering data even if failure occurs in an arbitrary number m of disk devices. In more detail, Nonpatent Document 1 shows a method for assigning redundant codes by an analogous method to the Reed-Solomon code using a Galois extension field.

Figure 9:
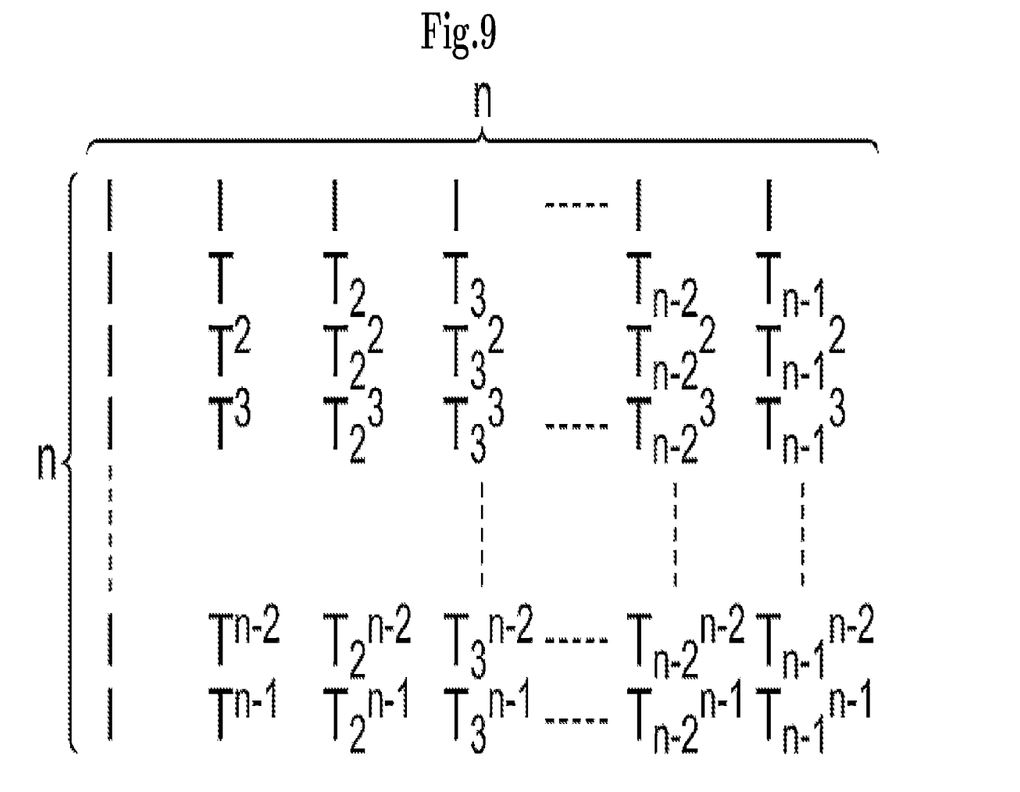
FIG. 9 is a diagram for explaining the conventional technique.

FIG. 9 serves to explain a method for implementing the method described in Nonpatent Document 1 into a number n of disk devices recording data (data disk devices), and disk array devices having the same number n of disk devices recording redundant codes (redundant disk devices). In FIG. 9, the operator T of a Galois extension field corresponds to the primitive root of the Galois extension field, while the index of T corresponds to other roots. Further, in Nonpatent Document 1 and Reed-Solomon code, the operators corresponding to the roots of a Galois extension field are expressed in the form of a transformation matrix T and powers of T.

Figure 10:
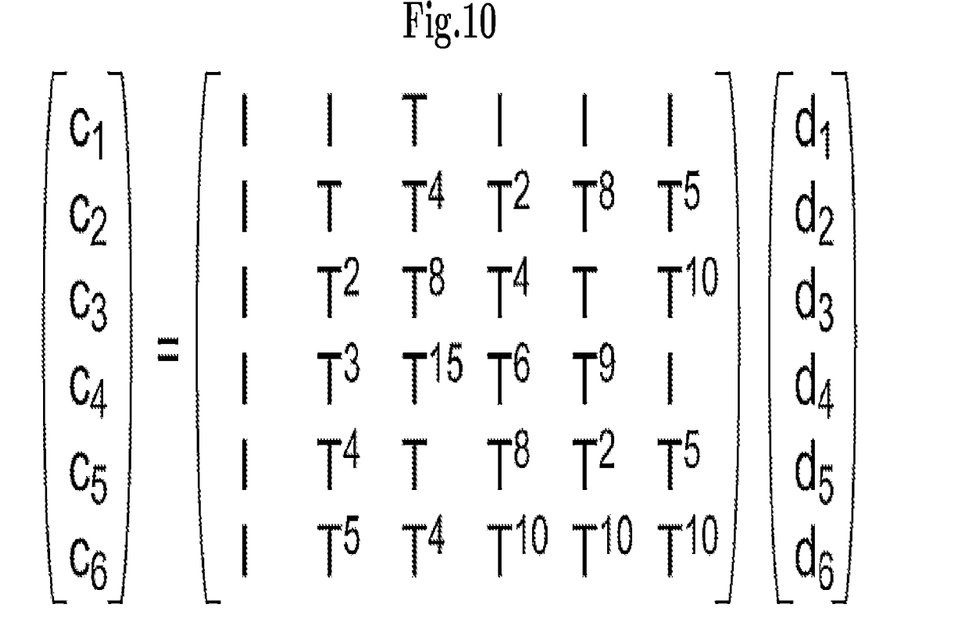
FIG. 10 is another diagram for explaining the conventional technique.

FIG. 10 shows a specific example of implementing the method described in Nonpatent Document 1 into a disk array device having six redundant disk devices for six data disk devices. As shown in FIG. 10, $gf(2^4)$ is used as the Galois extension field.

Figure 11:
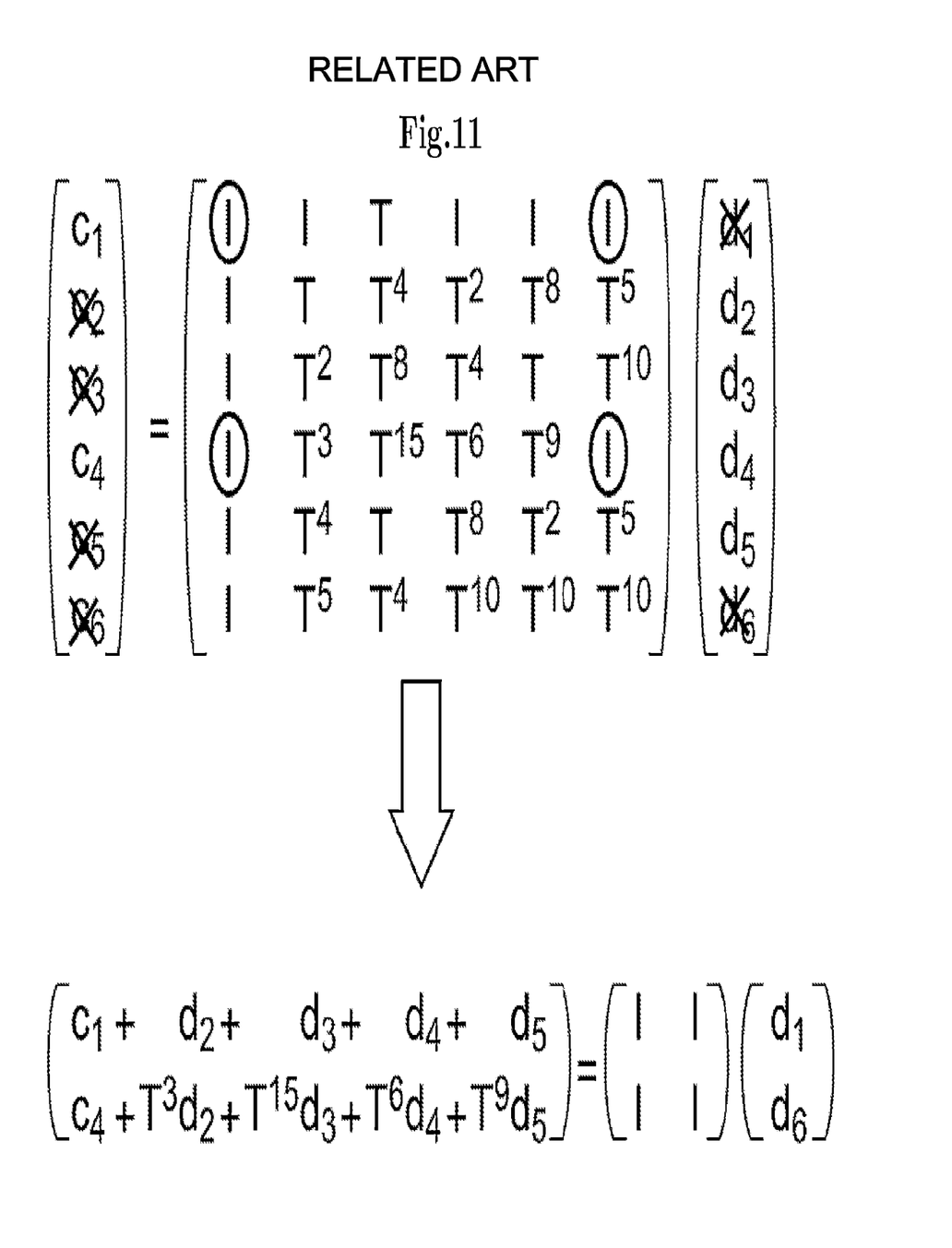
FIG. 11 is for explaining problems of the conventional technique.

FIG. 11 serves to explain problems in the case of implementing the method described in the Nonpatent Document 1 as shown in FIG. 10 into disk array device. FIG. 11 shows a data recovery method when failure has occurred in the data disk devices $d_1$ and $d_6$, and the redundant disk devices $c_2$, $c_3$, $c_5$, and $c_6$.

As shown in FIG. 11, with respect to the rows with the redundant disk devices in failure, because it is impossible to use the redundant codes recorded in the redundant disk devices to recover the original data, rows with normal redundant disks device are used for data recovery. In order to carry out the data recovery, a submatrix is to be obtained by extracting the rows with the normal redundant disk devices and the operators at the intersection points with the rows with the data disk devices in failure. By finding the inverse matrix from the obtained submatrix, it is possible to obtain the data of the data disk devices in failure.

However, as shown in FIG. 11, because every element of the extracted submatrix is unanimously I and the matrix is singular, the inverse matrix is not available. That is, the data recovery cannot be carried out. Therefore, based on the method described in Nonpatent Document 1, in order to avoid the problem that the data recovery cannot be carried out, it is necessary to change the Galois extension field used for encoding to a field with a longer period. For example, using $gf(2^8)$ can solve the above problem. However, this gives rise to another problem that $gf(2^8)$ is more complicated in computation than $gf(2^4)$, thereby resulting in a high cost for circuit implementation of the device, as well as a heavy load on computation.

SUMMARY

The present invention is made in view of the above problems, and an exemplary object thereof is to provide a disk array device and a disk array control program capable of keeping the computation device computing redundant codes at a low cost while reducing the computation load on the computation device.

A first aspect in accordance with the present invention provides a disk array device including: a plurality of disk devices; and a computation portion generating a redundant code data denoting a redundant code able to recover an actual data sent from a higher-level device based on the actual data and operators, when at least part of the actual data is lost.

Further, it is configured to write the actual data by a predetermined device quantity of first disk devices in a first disk device group composed of disk devices as the first disk devices among the plurality of disk devices; it is configured to write the redundant code data by second disk devices of the same quantity as the predetermined device quantity of the first disk devices, in a second disk device group composed of disk devices as the second disk devices other than the first disk devices among the plurality of disk devices; and the computation portion is configured to generate the redundant code data able to recover the actual data based on the data written into arbitrary disk devices of the device quantity among the plurality of disk devices, while the number of types of the operators used for generating the redundant code data is less than the device quantity by one or more.

Further, a second aspect in accordance with the present invention provides a disk array control method applied to a disk array device including a plurality of disk devices. The disk array control method includes: generating a redundant code data denoting a redundant code able to recover an actual data sent from a higher-level device based on the actual data and operators, when at least part of the actual data is lost; writing the actual data by a predetermined device quantity of first disk devices in a first disk device group composed of disk devices as the first disk devices among the plurality of disk devices; and writing the redundant code data by second disk devices of the same quantity as the predetermined device quantity of the first disk devices, in a second disk device group composed of disk devices as the second disk devices other than the first disk devices among the plurality of disk devices.

The disk array control method is further configured to generate the redundant code data able to recover the actual data based on the data written into arbitrary disk devices of the device quantity among the plurality of disk devices, while the number of types of the operators used for generating the redundant code data is less than the device quantity by one or more.

Further, a third aspect in accordance with the present invention provides a computer-readable medium storing a program for controlling disk array including instructions to be executed by a disk array device including a plurality of disk devices.

Further, the program for controlling disk array causes the disk array device to carry out the processes of: generating a redundant code data denoting a redundant code able to recover an actual data sent from a higher-level device based on the actual data and operators, when at least part of the actual data is lost; writing the actual data by a predetermined device quantity of first disk devices in a first disk device group composed of disk devices as the first disk devices among the plurality of disk devices; and writing the redundant code data by second disk devices of the same quantity as the predetermined device quantity of the first disk devices, in a second disk device group composed of disk devices as the second disk devices other than the first disk devices among the plurality of disk devices.

In addition, the program for controlling disk array is configured to further cause the disk array device to carry out the process of generating the redundant code data able to recover the actual data based on the data written into arbitrary disk devices of the device quantity among the plurality of disk devices, while the number of types of the operators used for generating the redundant code data is less than the device quantity by one or more.

According to the present invention, it is possible to provide a disk array device and a disk array control program capable of keeping the computation device computing redundant codes at a low cost while reducing the computation load on the computation device.

EXEMPLARY EMBODIMENTS

Figure 1:
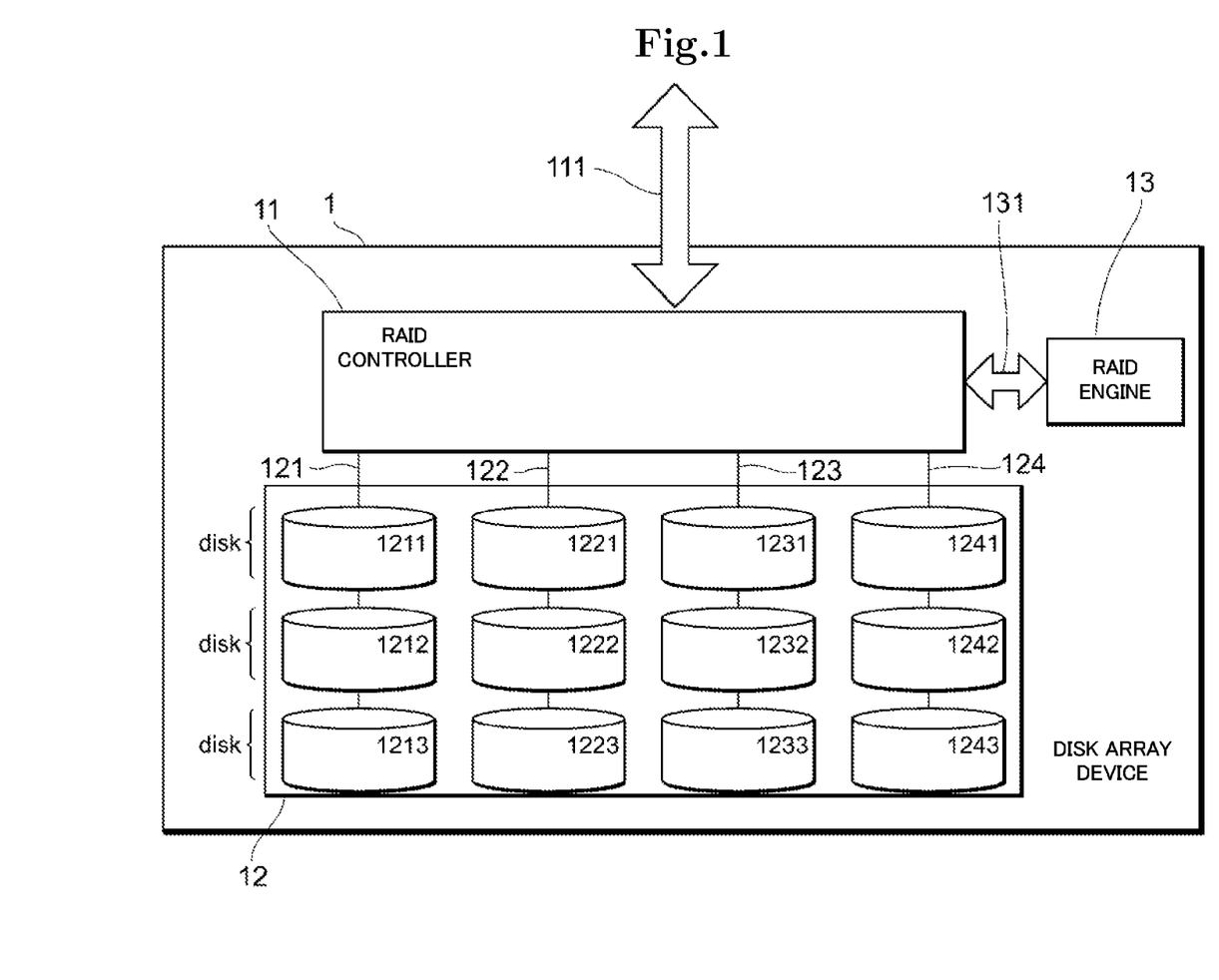
FIG. 1 shows a configuration of a disk array device in accordance with a first exemplary embodiment of the present invention.

FIG. 1 shows a configuration of a disk array device having applied the present invention. As shown in this figure, a disk array device 1 has a RAID controller 11, an interface 111, a RAID engine 13 which is a computation portion, and a plurality of disk devices 1211 to 1243.

The RAID controller 11 is configured to be communicable with the RAID engine 13 via a RAID engine path 131. Further, the RAID controller 11 is communicably connected to a higher-level device (a server for example; the illustration being omitted) via the interface 111, and to each of the disk devices 1211 to 1243 via inner disk paths 121 to 124. The plurality of disk devices 1211 to 1213, 1221 to 1223, 1231 to 1233, and 1241 to 1243 are connected to the RAID controller 11 via the inner disk paths 121, 122, 123, and 124, respectively.

The RAID controller 11 controls each device in the disk array device 1. Further, the RAID controller 11 receives a command from the higher-level device via the interface 111, and carries out a process according to the command. For example, when receiving a write command from the higher-level device via the interface 111, it writes (stores) a data (an actual data) into predetermined disk devices among the plurality of disk devices 1211 to 1243 (also referred to as data disk devices or first disk devices), as well as writes a redundant code computed from the data (a redundant code data) into predetermined disk devices (also referred to as redundant disk devices or second disk devices). In the first exemplary embodiment, the number of the disk devices (first disk devices) for writing a data (actual data) thereinto is configured to be the same as that of the disk devices (second disk devices) for writing a redundant code computed from the data (a redundant code data) thereinto. In other words, it is configured to write a data (actual data) and a redundant code (redundant code data) into 2×n (n is a natural number) disk devices, respectively. Further, the RAID controller 11 controls the RAID engine 13 for carrying out computation of redundant codes, and a data recovery process at the time of disk failure.

That is, it is configured to write an actual data by a first disk device group composed of a predetermined device number n of disk devices as the first disk devices among the plurality of disk devices 1211 to 1243. Further, it is configured to write a redundant code data by a second disk device group composed of the device number n of disk devices other than the first disk devices (the same number as the first disk devices) as the second disk devices among the plurality of disk devices 1211 to 1243.

The RAID engine 13 is, for example, of LSI (Large Scale Integration), and carries out RAID computation (Galois extension field computation) within itself after receiving the data (actual data), redundant code data and computation instruction from the RAID controller 11 via the RAID engine path 131. After carrying out the RAID computation, the RAID engine 13 sends back the computation result to the RAID controller 11 via the RAID engine path 131 again.

Figure 2:
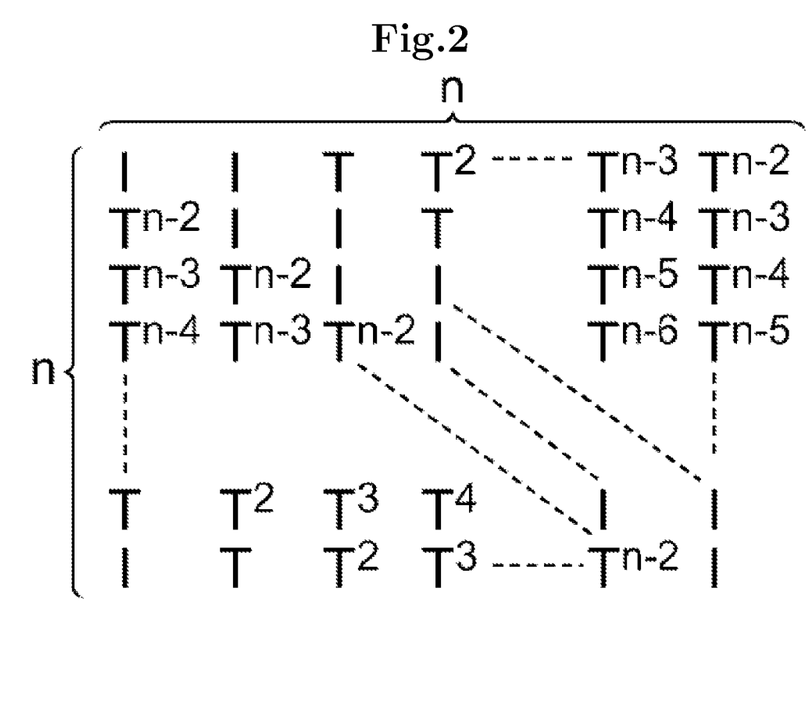
FIG. 2 shows an operational matrix of a redundant code in accordance with the first exemplary embodiment.

FIG. 2 shows an operational matrix of a redundant code for carrying out the RAID computation utilized in the present invention. Further, in this figure, a power of T is used as an operator, and the matrix is expandable as far as the power of T does not become equal to I.

For example, in gf (2^4,), because it is independent below the 15th power of T, it is configurable to assign 16 redundant disks to 16 data disks, that is, to implement up to the 14th power of T.

Figure 3:
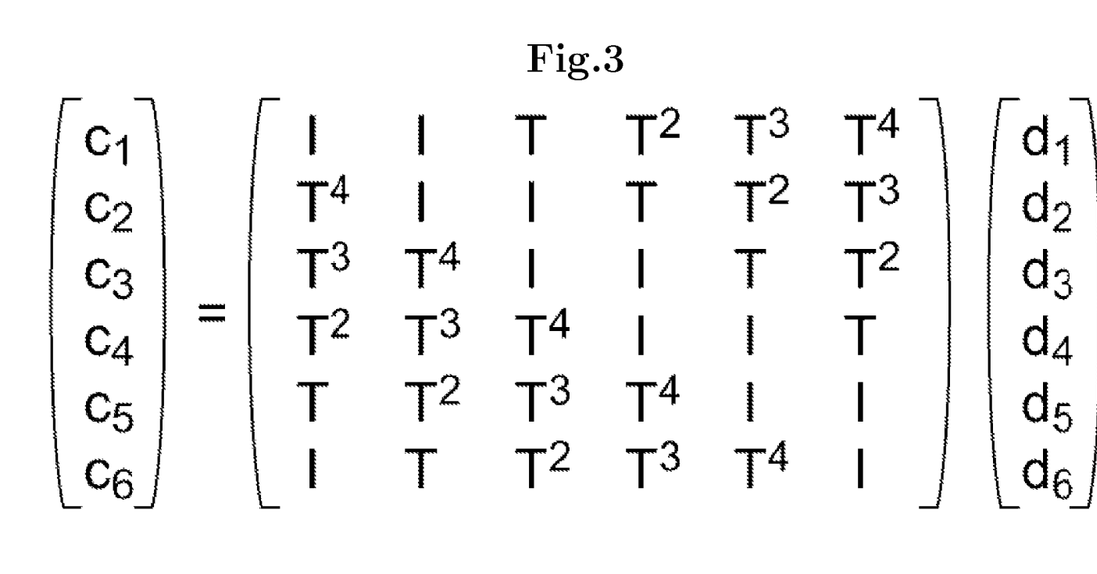
FIG. 3 shows an example of a transformation matrix for RAID computation in accordance with the first exemplary embodiment.

FIG. 3 shows a transformation matrix (operational matrix) for the RAID computation carried out by the disk array device 1 in the first exemplary embodiment.

As shown in FIG. 3, the transformation matrix is configured by only five operators: the unit operator I as an operator, the operator T corresponding to the root of a Galois extension field, and the second to fourth powers of T. This has greatly reduced the number of operators, compared with the case of needing 11 types of operators for the transformation matrix of the conventional technique explained in reference to FIG. 10. Further, in the first exemplary embodiment, although the number of operators has greatly reduced as described above, it is possible to achieve the effect of reducing the load on computation as far as it is configured to reduce the operators at least by one.

Further, in FIG. 3, a vector transformation is carried out on the input data $d_1$ to $d_6$ to compute the redundant codes $c_1$ to $c_6$.

That is, the input data $d_i$ (i is an integer from 1 to n) is the ith divided actual data of the divided actual data generated by dividing an actual data by the device number n. Further, the redundant code $c_i$ is the ith divided redundant code data of the divided redundant code data generated by dividing a redundant code data by the device number n. Further, I is the unit operator. T is the companion matrix based on the primitive polynomial of a Galois extension field, while $T^j$ is a matrix of the jth (j is an integer) power of the companion matrix T.

In the first exemplary embodiment, the RAID engine 13 generates the divided redundant code data $c_i$ based on the formula shown in FIG. 3, and the divided actual data $d_j$.

Figure 4:
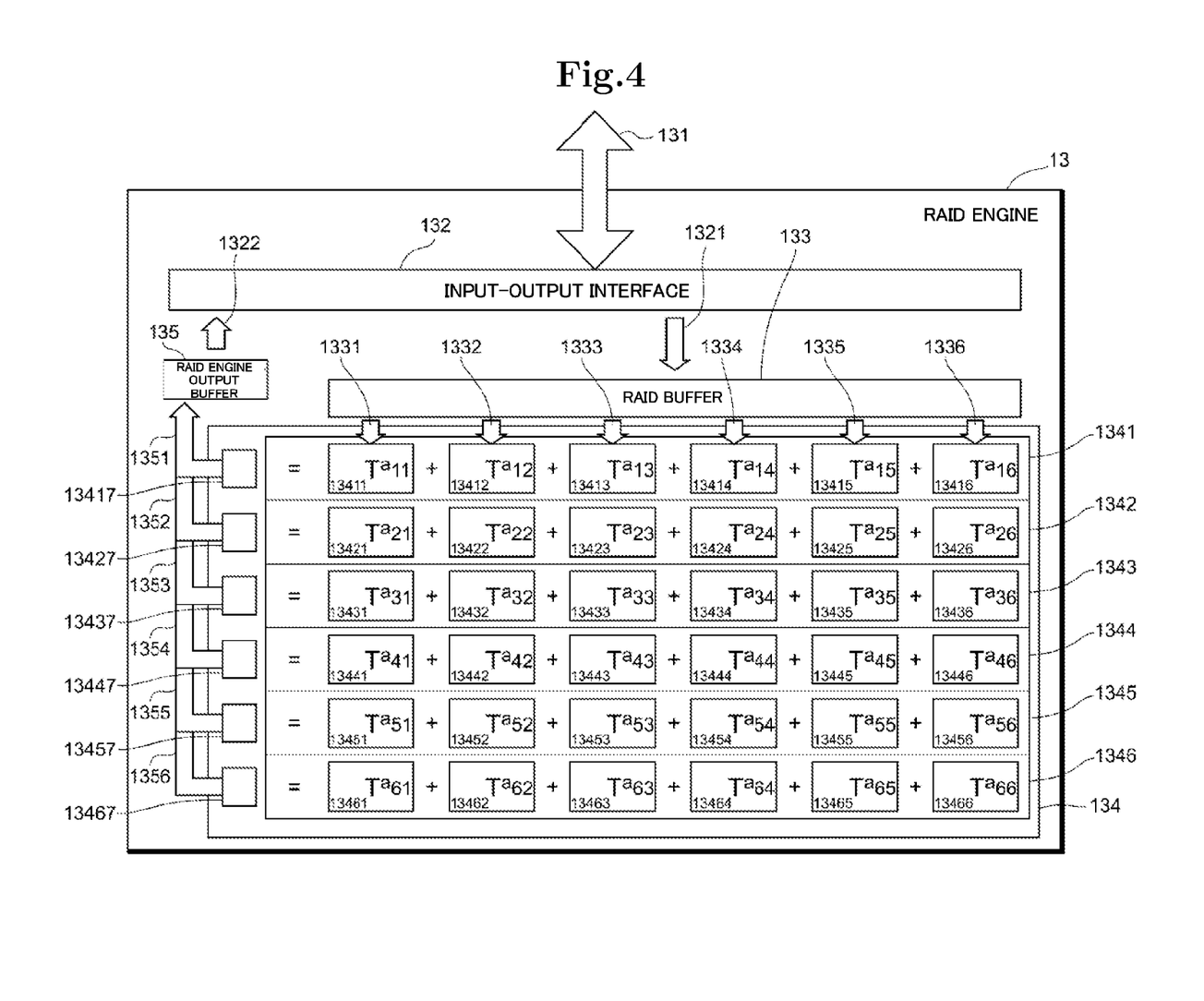
FIG. 4 shows a configuration of a RAID in accordance with the first exemplary embodiment.

FIG. 4 shows a configuration of the RAID engine 13. As shown in this figure, the RAID engine 13 has an input-output interface 132, a RAID engine input bus 1321, a RAID buffer 133, RAID engine inner buses 1331 to 1336, an operational matrix 134, RAID operators 13411 to 13466, RAID engine adders 1341 to 1346, computation storage buffers 13417 to 13467, RAID computation output buses 1351 to 1356, a RAID engine output buffer 135, and a RAID engine output bus 1322.

Further, the input-output interface 132 is communicably connected to the RAID controller 11 via the RAID engine path 131.

Next, the RAID computation process of the RAID engine 13 will be explained.

The RAID engine 13 sends the data and command received from the RAID controller 11 via the input-output interface 132 to the RAID buffer 133 via the RAID engine input bus 1321.

The RAID buffer 133 sends the received data and command to the respective RAID operators 13411 to 13466 inside the operational matrix 134 via the RAID engine inner buses 1331 to 1336.

The RAID operators 13411 to 13466 are arranged in the form of a matrix, and can broadcast a data to operators of the same column by using the RAID engine inner buses 1331 to 1336.

The RAID operators 13411 to 13466 function as the operators of a Galois extension field, respectively, so as to let each of the proper operators act for the data inputted from the RAID engine inner buses 1331 to 1336, and output the computation result to the RAID engine adders 1341 to 1346.

The RAID engine adders 1341 to 1346 add the values of the Galois extension field inputted from the RAID operators 13411 to 13466, and output the results to the computation storage buffers 13417 to 13467.

The computation storage buffers 13417 to 13467 output the computation results inputted from the RAID engine adders 1341 to 1346 to the RAID engine output buffer 135 via the RAID computation output buses 1351 to 1356.

The RAID engine output buffer 135 outputs the computation result to the input-output interface 132 via the RAID engine output bus 1322.

The input-output interface 132 sends the computation result inputted from the RAID engine output buffer 135 to the RAID controller 11 via the RAID engine path 131. In the above manner, the RAID computation process is carried out.

Further, although the transformation matrix explained in reference to FIG. 4 shows the case of a 6×6 matrix, this transformation matrix is merely an exemplary embodiment, and thus should not be limited to a 6×6 matrix.

Further, in FIG. 4, each of the RAID operators 13411 to 13466 is described in the form of a power of the transformation matrix T. In the first exemplary embodiment, the assumed logic is to compute the Galois extension field of gf (2^4). This is because Nonpatent Document 1 shows that computation is possible for the vector transformation in the Galois extension field of gf (2^4) by the companion matrix T and the matrixes of its powers based on the primitive polynomial x^4+x+1=0 of the Galois extension field gf (2^4).

Further, although the Galois extension field gf (2^4) is used in the first exemplary embodiment, it is also possible to use other Galois extension fields.

Figure 5:
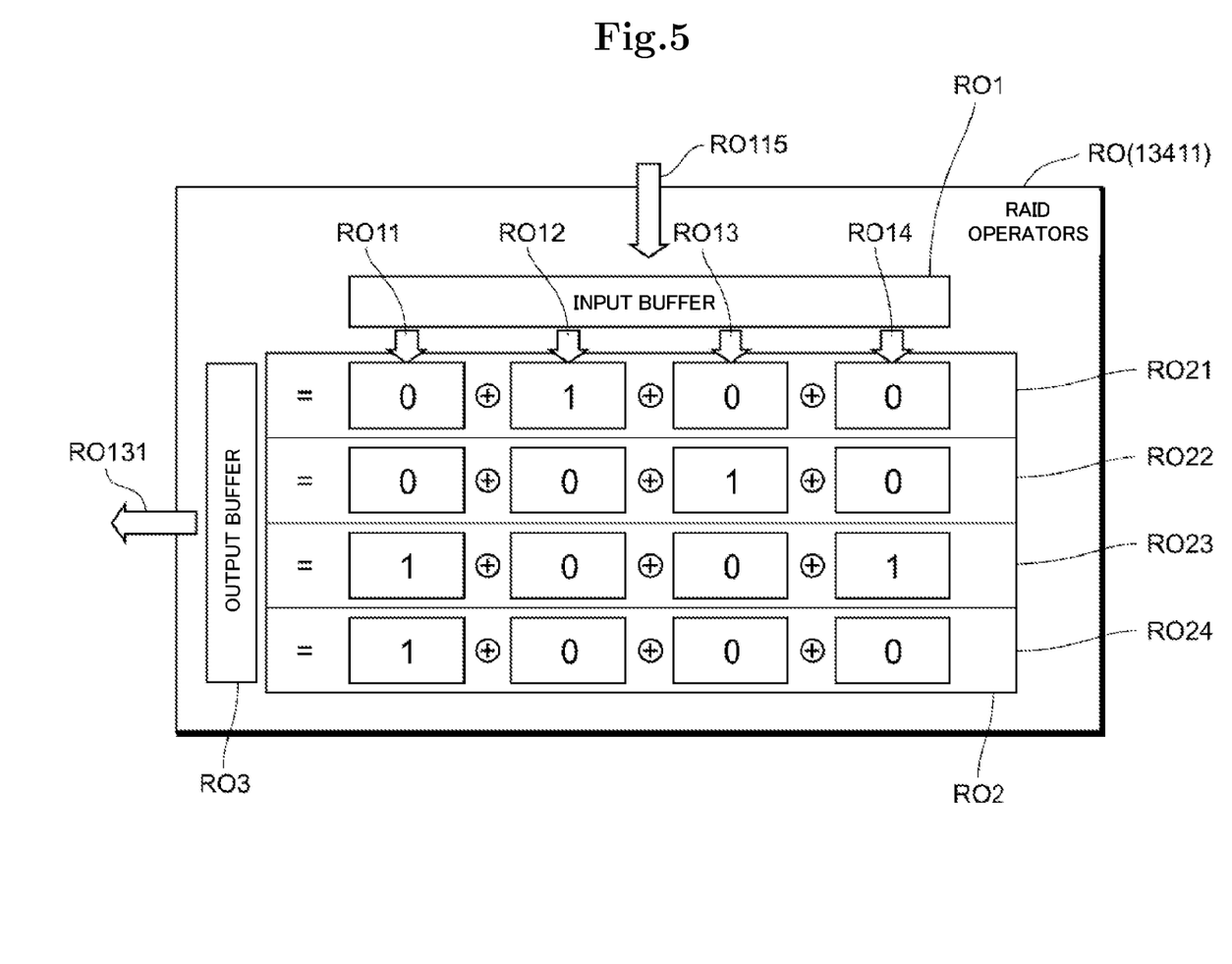
FIG. 5 shows a configuration of a RAID operator in accordance with the first exemplary embodiment.

FIG. 5 shows a configuration of the respective RAID operators 13411 to 13466 of FIG. 4. FIG. 5 shows, as an example, the configuration of the RAID operator 13411. Further, because the configuration of the other RAID operators 13412 to 13466 is the same as that of the RAID operator 13411, detailed explanation for that is omitted.

As shown in FIG. 5, as the operator in the Galois extension field gf (2^4), the RAID operator RO (13411) is expressed as a 4×4 transformation matrix RO2. The RAID operator RO has an input buffer RO1, operator input buses RO11 to RO14, adders RO21 to RO24, an output buffer RO3, and an output bus RO131.

Next, the operation of the RAID operators RO (13411) will be explained.

As shown in FIG. 5, data is inputted to the input buffer RO1 via an input bus RO115. In the Galois extension field gf ($2^4$), data is expressed by 4-bit vectors. The data inputted to the input buffer RO1 is inputted to the transformation matrix RO2 via the operator input buses RO11 to RO14.

The transformation matrix RO2 vector-transforms the input value by the adders RO21 to RO24, and outputs the vector-transformed computation result to the output buffer RO3.

In this manner, the computation result inputted to the output buffer RO3 from the adders RO21 to RO24 is outputted to the aforementioned RAID engine adder 1341 by the output bus RO131. The RAID operator RO (13411) operates in the above manner.

Further, although the first exemplary embodiment uses the companion matrix T as the transformation matrix RO2 based on the primitive polynomial $x^4+x+1=0$ of the Galois extension field ($2^4$), it should not be limited to this configuration.

Figure 6:
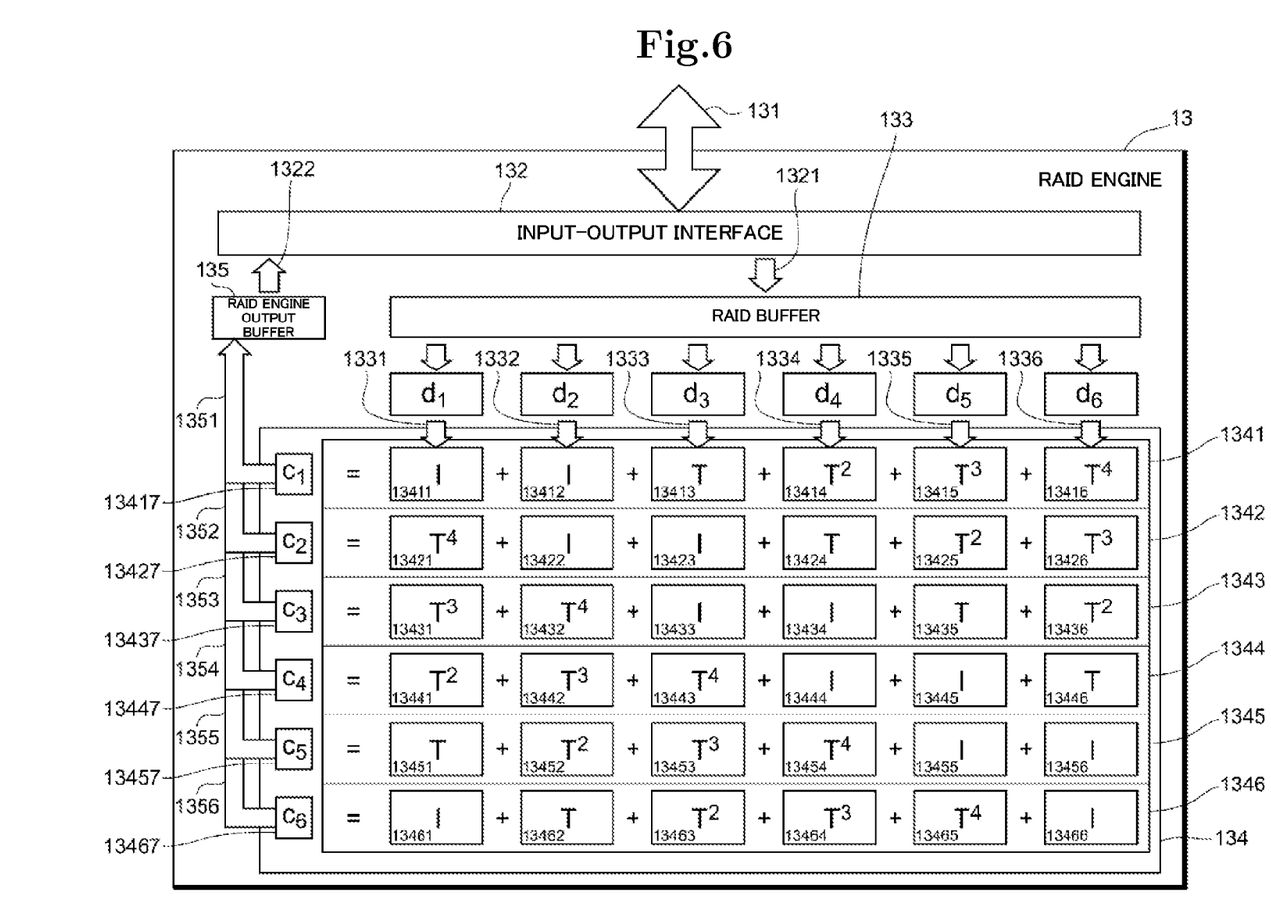
FIG. 6 is for explaining a processing example of a RAID engine in accordance with the first exemplary embodiment.

Next, referring to FIG. 6, explanations will be explained with respect to an example of the method for computing redundant codes carried out by the RAID engine 13 in the first exemplary embodiment. In this figure, the RAID engine 13 is configured to carry out transformation by the operational matrix 134 for the input of the data $d_1$ to $d_6$, compute the redundant codes $c_1$ to $c_6$, and output the computation result to the RAID controller 11.

In this manner, the RAID engine 13 constitutes a computation portion to generate the redundant code data denoting the redundant codes able to recover an actual data sent from a higher-level device when at least part of the actual data is lost, based on the actual data and the operators.

Further, in the first exemplary embodiment, in the RAID engine 13, the number of operator types used for generating the redundant code data is less than the device number n by one or more. In addition, the RAID engine 13 is configured to generate the redundant code data allowing the actual data to be recovered based on the data written into an arbitrary device number n of disk devices among the plurality of disk devices.

Further, in the RAID engine 13, at least one of the operators is an operator based on the Galois extension field. In particular, in the RAID engine 13, at least one operator is a companion matrix based on the primitive polynomial of the Galois extension field, and at least another one operator is a matrix of a power of the companion matrix.

Next, referring to FIG. 7, an explanation will be made for a comparison with the aforementioned conventional technique explained in reference to FIG. 11. In order to make the comparison clear, in the same manner as in FIG. 11, the explanation will be made on a method for recovering the data $d_1$ and $d_6$, and the redundant codes $c_2$, $c_3$, $c_5$, and $c_6$ when the data $d_1$ and $d_6$, and the redundant codes $c_2$, $c_3$, $c_5$, and $c_6$ have been lost due to some failure.

Figure 7:
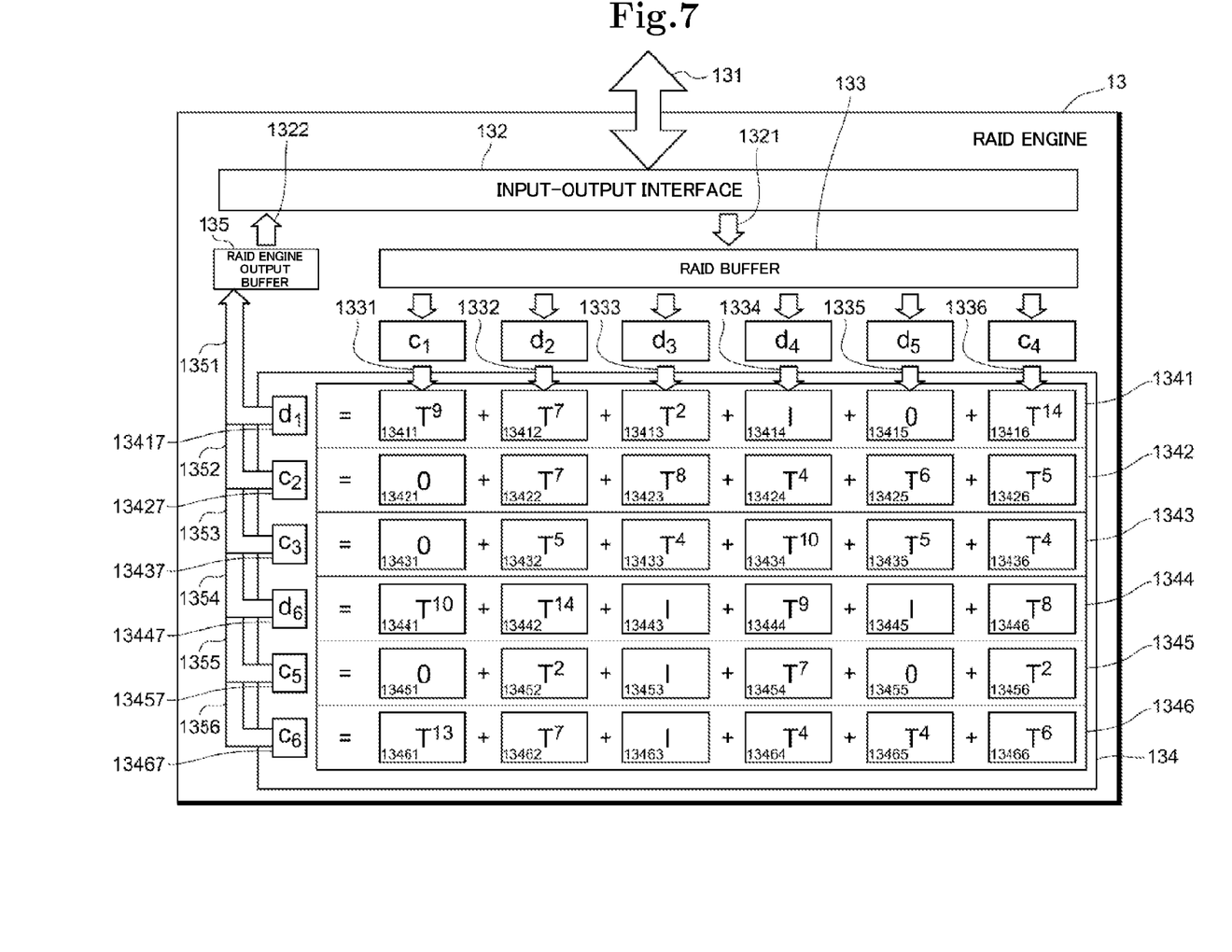
FIG. 7 is for explaining a comparison between the RAID engine processing and a conventional technique in accordance with the first exemplary embodiment.

As shown in FIG. 7, in the RAID engine 13, when the data $d_2$, $d_3$, $d_4$, and $d_5$, and the redundant codes $c_1$ and $c_4$ are inputted, it is possible to recover the data $d_1$ and $d_6$, by carrying out the matrix transformation and, at the same time of this process, it is possible to carry out a process of recomputing the redundant codes $c_2$, $c_3$, $c_5$, and $c_6$.

According to the disk array device 1 configured in the above manner, even in case of losing data of a number of disk devices (data disk devices and redundant code disk devices) equal to or less than the number of disk devices recording the redundant codes (also referred to as n units below), it is still possible to recover those data.

On the other hand, because the disk array device 1 can protect the data for combined failures of any n units, it is possible to guarantee a higher reliability than the RAID1 configuration.

Further, it is easier for the disk array device 1 to compute redundant codes than by the method disclosed in Nonpatent Document 1. Especially, in the method disclosed in Nonpatent Document 1, while the redundancy of disk devices becomes high, it is also necessary to use a multiple-value-purpose Galois extension field adopted for computation. Therefore, by this method, the number of computation bits increases for an actual computation, thereby wasting the computation resource. In contrast to this, the disk array device 1 can denote a necessary Galois extension field with a small number of bits, thereby allowing the use of computation resource to be reduced.

For example, if the disk array device is composed of six data disk devices and six redundant code disk devices, then in the configuration of the thesis of Nonpatent Document 1, as shown in FIG. 11, it is indispensable to use codes of gf ($2^5$) or higher as the Galois extension field. This is because from the matrix equation of FIG. 10, it is necessary to have a Galois extension field of the period 16 or longer. Because the period of the Galois extension field gf ($2^4$) is $15=2^4-1$, it is not sufficient for the implementation of FIG. 10. Further, if this technique is implemented, then because the value of the Galois extension field depends on the bit width of data, gf ($2^8$) or gf ($2^{16}$) is used. These are more complicated in computation than gf ($2^4$), thereby wasting computation resource.

In contrast to the above case, even if gf ($2^4$) is used, the disk array device 1 can still implement up to 16 data disk devices and 16 redundant code disk devices, thereby allowing the computation cost to be reduced considerably.

A Second Exemplary Embodiment

Figure 8:
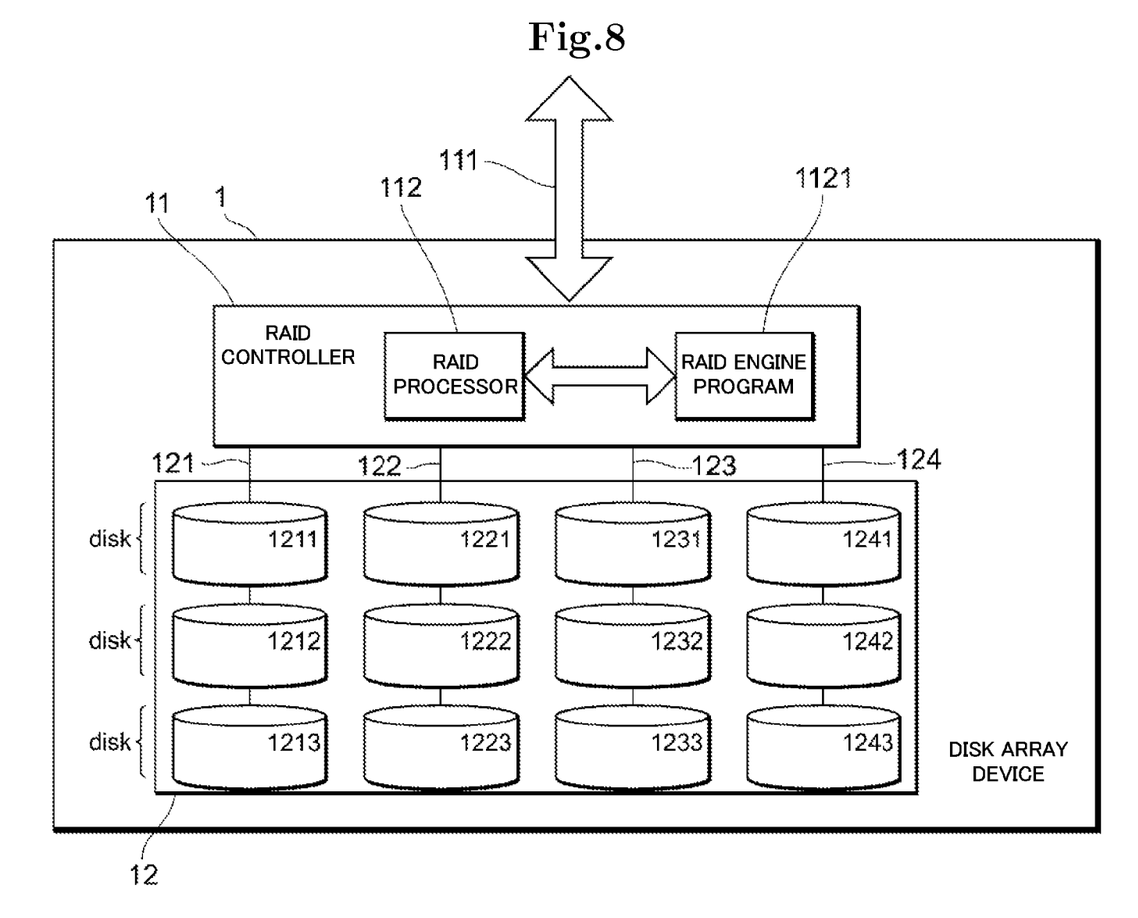
FIG. 8 shows a configuration of a disk array device in accordance with a second exemplary embodiment of the present invention.

FIG. 8 shows a configuration of a disk array device in accordance with a second exemplary embodiment of the present invention. Further, because the second exemplary embodiment is different from the first exemplary embodiment only in the components within the RAID controller 11, the same reference numerals are assigned to the other components, while detailed explanations therefor will be omitted.

As shown in this figure, the RAID controller 11 has a RAID processor 112, and a RAID engine program 1121. The RAID engine program 1121 is for carrying out the same process as the aforementioned RAID computation process carried out by the RAID engine 13.

Therefore, the disk array device 1 carries out the aforementioned RAID computation process, which was carried out by the RAID engine 13, by letting the RAID processor 112 execute the RAID engine program 1121.

In this manner, if the RAID processor 112 is configured to carry out the RAID computation process according to the RAID engine program 1121, then the disk array device 1 is able to exert the same effect as in the first exemplary embodiment.

Further, the present invention should not be limited to the above exemplary embodiments, but various modifications thereof are possible in its application.

Further, for example, the whole or part of the exemplary embodiments disclosed above may also be described as, but not limited to, the following supplementary notes.

(Supplementary Note 1)
A disk array device comprising:
first disk devices for writing a data sent from a higher-level device thereinto;
a computation portion generating a redundant code based on the data written into the first disk devices, and operators; and
second disk devices for writing the redundant code generated by the computation portion thereinto,
wherein there are a predetermined quantity of the first disk devices and the second devices, respectively;
wherein the number of types of the operators used by the computation portion to generate the redundant code is less than the device quantity of the second disk devices by one or more; and
wherein the computation portion is characterized by generating the redundant code able to recover a lost data in the case of losing the data of arbitrary disk devices of a quantity no more than the predetermined quantity among the first disk devices and the second disk devices.

(Supplementary Note 2)
A program for controlling disk array comprising instructions for causing a disk array device to realize a function,
the disk array device comprising:
first disk devices for writing a data sent from a higher-level device thereinto;
a computation portion generating a redundant code based on the data written into the first disk devices, and operators; and
second disk devices for writing the redundant code generated by the computation portion thereinto,
wherein there are a predetermined quantity of the first disk devices and the second devices, respectively,
the function comprising:
generating the redundant code able to recover a lost data in the case of losing the data of arbitrary disk devices of a quantity no more than the predetermined quantity among the first disk devices and the second disk devices, by using operators whose types are less than the device quantity of the second disk devices by one or more.

(Supplementary Note 3)
A disk array device comprising:
first disk devices for writing a data sent from a higher-level device thereinto;
a computation portion generating a redundant code based on the data written into the first disk devices, and operators; and
second disk devices for writing the redundant code generated by the computation portion thereinto,
the disk array device writing the data and the redundant code into 2×n (any natural number) disk devices, respectively,
wherein the number of types of the operators used by the computation portion to generate the redundant code is less than the n by one or more; and
wherein the disk array device is characterized by generating the redundant code able to recover a lost data in the case of losing the data of the first disk devices and the second disk devices of no more than an arbitrary quantity of the n among the first disk devices and the second disk devices into which the data is written.

(Supplementary Note 4)
A program for controlling disk array comprising instructions for causing a disk array device to realize a function,
the disk array device comprising:
first disk devices for writing a data sent from a higher-level device thereinto;
a computation portion generating a redundant code based on the data written into the first disk devices, and operators; and
second disk devices for writing the redundant code generated by the computation portion thereinto,
the disk array device writing the data and the redundant code into 2×n (any natural number) disk devices, respectively,
the function comprising:
generating the redundant code able to recover a lost data by using the operators whose types are less than the n by one or more, in the case of losing the data of the first disk devices and the second disk devices of no more than an arbitrary quantity of the n among the first disk devices and the second disk devices into which the data is written.

(Supplementary Note 2-1)
A disk array device comprising:
a plurality of disk devices; and
a computation portion generating a redundant code data denoting a redundant code able to recover an actual data sent from a higher-level device based on the actual data and operators, when at least part of the actual data is lost,
wherein it is configured to write the actual data by a predetermined device quantity of first disk devices in a first disk device group composed of disk devices as the first disk devices among the plurality of disk devices;
wherein it is configured to write the redundant code data by second disk devices of the same quantity as the predetermined device quantity of the first disk devices, in a second disk device group composed of disk devices as the second disk devices other than the first disk devices among the plurality of disk devices; and
wherein the computation portion is configured to generate the redundant code data able to recover the actual data based on the data written into arbitrary disk devices of the device quantity among the plurality of disk devices, while the number of types of the operators used for generating the redundant code data is less than the device quantity by one or more.

(Supplementary Note 2-2)
The disk array device according to Supplementary Note 2-1, wherein at least one of the operators is an operator based on a Galois extension field.

(Supplementary Note 2-3)
The disk array device according to Supplementary Note 2-2, wherein at least one of the operators is a companion matrix based on the primitive polynomial of the Galois extension field, while at least another one of the operators is a matrix of a power of the companion matrix.

(Supplementary Note 2-4)
The disk array device according to Supplementary Note 2-3, wherein the computation portion is configured to generate a divided redundant code data $c_i$ based on the following formula 2 and a divided actual data $d_i$, where n (n is a natural number) is let to be the device quantity; $d_i$ is let to be the ith (i is an integer from 1 to n) divided actual data of a divided actual data generated by dividing the actual data by the device quantity n; $c_i$ is let to be the ith divided redundant code data of a divided redundant code data generated by dividing the redundant code data by the device quantity n; I is let to be the unit operator; T is let to be the companion matrix based on the primitive polynomial of the Galois extension field; and $T^j$ (j is an integer) is let to be a matrix of the jth power of the companion matrix.

$$\begin{bmatrix} c_1 \\ c_2 \\ c_3 \\ c_4 \\ \vdots \\ c_{n-1} \\ c_n \end{bmatrix} = \begin{bmatrix} I & I & T & T^2 & \cdots & T^{n-3} & T^{n-2} \\ T^{n-2} & I & I & T & \cdots & T^{n-4} & T^{n-3} \\ T^{n-3} & T^{n-2} & I & I & \cdots & T^{n-5} & T^{n-4} \\ T^{n-4} & T^{n-3} & T^{n-2} & I & \cdots & T^{n-6} & T^{n-5} \\ \vdots & \vdots & \vdots & \vdots & \ddots & \vdots & \vdots \\ T & T^2 & T^3 & T^4 & \cdots & I & I \\ I & T & T^2 & T^3 & \cdots & T^{n-2} & I \end{bmatrix} \begin{bmatrix} d_1 \\ d_2 \\ d_3 \\ d_4 \\ \vdots \\ d_{n-1} \\ d_n \end{bmatrix}$$ [Formula 2]

(Supplementary Note 2-5)

A disk array control method applied to a disk array device including a plurality of disk devices, the disk array control method comprising:

generating a redundant code data denoting a redundant code able to recover an actual data sent from a higher-level device based on the actual data and operators, when at least part of the actual data is lost;

writing the actual data by a predetermined device quantity of first disk devices in a first disk device group composed of disk devices as the first disk devices among the plurality of disk devices; and writing the redundant code data by second disk devices of the same quantity as the predetermined device quantity of the first disk devices, in a second disk device group composed of disk devices as the second disk devices other than the first disk devices among the plurality of disk devices, wherein the disk array control method is further configured to generate the redundant code data able to recover the actual data based on the data written into arbitrary disk devices of the device quantity among the plurality of disk devices, while the number of types of the operators used for generating the redundant code data is less than the device quantity by one or more.

(Supplementary Note 2-6)

A computer-readable medium storing a program for controlling disk array comprising instructions for causing a disk array device including a plurality of disk devices to carry out the processes of:

generating a redundant code data denoting a redundant code able to recover an actual data sent from a higher-level device based on the actual data and operators, when at least part of the actual data is lost;

writing the actual data by a predetermined device quantity of first disk devices in a first disk device group composed of disk devices as the first disk devices among the plurality of disk devices; and writing the redundant code data by second disk devices of the same quantity as the predetermined device quantity of the first disk devices, in a second disk device group composed of disk devices as the second disk devices other than the first disk devices among the plurality of disk devices, wherein the program for controlling disk array is configured to further cause the disk array device to carry out the process of generating the redundant code data able to recover the actual data based on the data written into arbitrary disk devices of the device quantity among the plurality of disk devices, while the number of types of the operators used for generating the redundant code data is less than the device quantity by one or more.

The present invention is widely applicable to disk array devices storing data redundantly, and programs for controlling disk arrays.

The invention claimed is:

1. A disk array device comprising:

a plurality of disk devices; and a computation portion configured to generate a redundant code data denoting a redundant code able to recover an actual data sent from a higher-level device based on the actual data and operators, when at least part of the actual data is lost, wherein a predetermined device quantity of first disk devices in a first disk device group among the plurality of disk devices is configured to write the actual data;

wherein second disk devices different from the first disk devices in a second disk device group among the plurality of disk devices are configured to write the redundant code data, a quantity of the second disk devices being the same as the predetermined device quantity of the first disk devices;

wherein the computation portion is configured to generate the redundant code data able to recover the actual data based on the data written into arbitrary disk devices of the predetermined device quantity among the plurality of disk devices, while the number of types of the operators used for generating the redundant code data is less than the predetermined device quantity;

wherein the computation portion is further configured to generate a divided redundant code data $c_i$ based on the following formula 1 and a divided actual data $d_i$, where n (n is a natural number) is let to be the predetermined device quantity; $d_i$ is let to be the ith (i is an integer from 1 to n) divided actual data of a divided actual data generated by dividing the actual data by the predetermined device quantity n; $c_i$ is let to be the ith divided redundant code data of a divided redundant code data generated by dividing the redundant code data by the predetermined device quantity n; I is let to be the unit operator; T is let to be the companion matrix based on the primitive polynomial of the Galois extension field; and $T^j$ (j is an integer) is let to be a matrix of the jth power of the companion matrix; and wherein at least one of the operators is an operator based on a Galois extension field $$\begin{bmatrix} c_1 \\ c_2 \\ c_3 \\ c_4 \\ \vdots \\ c_{n-1} \\ c_n \end{bmatrix} = \begin{bmatrix} I & I & T & T^2 & \cdots & T^{n-3} & T^{n-2} \\ T^{n-2} & I & I & T & \cdots & T^{n-4} & T^{n-3} \\ T^{n-3} & T^{n-2} & I & I & \cdots & T^{n-5} & T^{n-4} \\ T^{n-4} & T^{n-3} & T^{n-2} & I & \cdots & T^{n-6} & T^{n-5} \\ \vdots & \vdots & \vdots & \vdots & \ddots & \vdots & \vdots \\ T & T^2 & T^3 & T^4 & \cdots & I & I \\ I & T & T^2 & T^3 & \cdots & T^{n-2} & I \end{bmatrix} \begin{bmatrix} d_1 \\ d_2 \\ d_3 \\ d_4 \\ \vdots \\ d_{n-1} \\ d_n \end{bmatrix}$$ [Formula 1]

2. The disk array device according to claim 1, wherein at least one of the operators is a companion matrix based on the primitive polynomial of the Galois extension field, while at least another one of the operators is a matrix of a power of the companion matrix.

3. A disk array control method applied to a disk array device including a plurality of disk devices, the disk array control method comprising:

generating a redundant code data denoting a redundant code able to recover an actual data sent from a higher-level device based on the actual data and operators, when at least part of the actual data is lost;

writing the actual data by a predetermined device quantity of first disk devices in a first disk device group composed of disk devices as the first disk devices among the plurality of disk devices;

writing the redundant code data by second disk devices of the same quantity as the predetermined device quantity of the first disk devices, in a second disk device group composed of disk devices as the second disk devices other than the first disk devices among the plurality of disk devices, wherein the disk array control method is further configured to generate the redundant code data able to recover the actual data based on the data written into arbitrary disk devices of the predetermined device quantity among the plurality of disk devices, while the number of types of the operators used for generating the redundant code data is less than the predetermined device quantity by one or more; and generating a divided redundant code data $c_i$ based on the following formula 1 and a divided actual data $d_i$, where n (n is a natural number) is let to be the predetermined device quantity; $d_i$ is let to be the ith (i is an integer from 1 to n) divided actual data of a divided actual data generated by dividing the actual data by the predetermined device quantity n; $c_i$ is let to be the ith divided redundant code data of a divided redundant code data generated by dividing the redundant code data by the predetermined device quantity n; I is let to be the unit operator; T is let to be the companion matrix based on the primitive polynomial of the Galois extension field; and $T^j$ (j is an integer) is let to be a matrix of the jth power of the companion matrix, wherein at least one of the operators is an operator based on a Galois extension field $$\begin{bmatrix} c_1 \\ c_2 \\ c_3 \\ c_4 \\ \vdots \\ c_{n-1} \\ c_n \end{bmatrix} = \begin{bmatrix} I & I & T & T^2 & \cdots & T^{n-3} & T^{n-2} \\ T^{n-2} & I & I & T & \cdots & T^{n-4} & T^{n-3} \\ T^{n-3} & T^{n-2} & I & I & \cdots & T^{n-5} & T^{n-4} \\ T^{n-4} & T^{n-3} & T^{n-2} & I & \cdots & T^{n-6} & T^{n-5} \\ \vdots & \vdots & \vdots & \vdots & \ddots & \vdots & \vdots \\ T & T^2 & T^3 & T^4 & \cdots & I & I \\ I & T & T^2 & T^3 & \cdots & T^{n-2} & I \end{bmatrix} \begin{bmatrix} d_1 \\ d_2 \\ d_3 \\ d_4 \\ \vdots \\ d_{n-1} \\ d_n \end{bmatrix}. \quad \text{[Formula 1]}$$

4. A non-transitory computer-readable medium storing a program for controlling disk array comprising instructions for causing a disk array device including a plurality of disk devices to carry out the processes of:

generating a redundant code data denoting a redundant code able to recover an actual data sent from a higher-level device based on the actual data and operators, when at least part of the actual data is lost;

writing the actual data by a predetermined device quantity of first disk devices in a first disk device group composed of disk devices as the first disk devices among the plurality of disk devices;

writing the redundant code data by second disk devices of the same quantity as the predetermined device quantity of the first disk devices, in a second disk device group composed of disk devices as the second disk devices other than the first disk devices among the plurality of disk devices, wherein the program for controlling disk array is configured to further cause the disk array device to carry out the process of generating the redundant code data able to recover the actual data based on the data written into arbitrary disk devices of the predetermined device quantity among the plurality of disk devices, while the number of types of the operators used for generating the redundant code data is less than the predetermined device quantity by one or more; and generating a divided redundant code data $c_i$ based on the following formula 1 and a divided actual data $d_i$, where n (n is a natural number) is let to be the predetermined device quantity; $d_i$ is let to be the ith (i is an integer from 1 to n) divided actual data of a divided actual data generated by dividing the actual data by the predetermined device quantity n; $c_i$ is let to be the ith divided redundant code data of a divided redundant code data generated by dividing the redundant code data by the predetermined device quantity n; I is let to be the unit operator; T is let to be the companion matrix based on the primitive polynomial of the Galois extension field; and $T^j$ (j is an integer) is let to be a matrix of the jth power of the companion matrix, wherein at least one of the operators is an operator based on a Galois extension field $$\begin{bmatrix} c_1 \\ c_2 \\ c_3 \\ c_4 \\ \vdots \\ c_{n-1} \\ c_n \end{bmatrix} = \begin{bmatrix} I & I & T & T^2 & \cdots & T^{n-3} & T^{n-2} \\ T^{n-2} & I & I & T & \cdots & T^{n-4} & T^{n-3} \\ T^{n-3} & T^{n-2} & I & I & \cdots & T^{n-5} & T^{n-4} \\ T^{n-4} & T^{n-3} & T^{n-2} & I & \cdots & T^{n-6} & T^{n-5} \\ \vdots & \vdots & \vdots & \vdots & \ddots & \vdots & \vdots \\ T & T^2 & T^3 & T^4 & \cdots & I & I \\ I & T & T^2 & T^3 & \cdots & T^{n-2} & I \end{bmatrix} \begin{bmatrix} d_1 \\ d_2 \\ d_3 \\ d_4 \\ \vdots \\ d_{n-1} \\ d_n \end{bmatrix}. \quad \text{[Formula 1]}$$

\* \* \* \* \*